United States Patent [19]
Bratten

[11] Patent Number: 6,116,616
[45] Date of Patent: Sep. 12, 2000

[54] SEALING ARRANGEMENT FOR MACHINE/TOOL COOLANT COLLECTION TROUGHS

[76] Inventor: Jack R. Bratten, 5970 St. James Dr., West Bloomfield, Mich. 48322

[21] Appl. No.: 09/056,224

[22] Filed: Apr. 7, 1998

[51] Int. Cl.[7] .................................................. F16J 15/48
[52] U.S. Cl. ................................... 277/646; 29/DIG. 86; 29/DIG. 101; 409/134
[58] Field of Search .................................. 277/646, 906, 277/921; 498/818, 771; 239/724; 29/564, DIG. 101, DIG. 86; 409/134

[56] References Cited

U.S. PATENT DOCUMENTS 2,978,095  4/1961  Jenike .
3,178,779  4/1965  Clark et al. .............................. 277/646
5,567,048  10/1996  Hammonds ......................... 277/646 X
5,961,128  10/1999  Klammer ................................. 277/646

*Primary Examiner*—Anthony Knight
*Assistant Examiner*—Karlena D. Schwing
*Attorney, Agent, or Firm*—John R. Benefiel

[57] ABSTRACT

A sealing arrangement is provided to close off and seal a gap between undersurfaces of a machine tool installation and a coolant collection channel. The sealing arrangement includes a pair of lengths of sealing hoses inflated with air pressure to close off and seal the gap. The inflated hose seals accommodate the variable gap created by sloping collection troughs to simplify the construction thereof.

8 Claims, 2 Drawing Sheets

SEALING ARRANGEMENT FOR MACHINE/TOOL COOLANT COLLECTION TROUGHS

BACKGROUND OF INVENTION

This invention concerns coolant collection systems for machine tools, such as described in copending U.S. Ser. No. 08/995,447 filed on Dec. 22, 1997, attorney docket no. FSC-160. Coolant is directed in streams at cutting tools in machine tool installations in order to cool the tools and to reduce friction involved in machining the parts, the coolants typically comprised of water and water soluble lubricants. The machine tool installations may be comprised of a single stand alone machine tool or of a series of machine tools arranged along a transfer line. A sloping collection channel such as an above grade trough collects the coolant draining downwardly from the various surfaces drenched by the coolant streams. By gravity-induced flow down the length of the trough, the coolant and the entrained solids move into settling tanks, sumps, or basins, prior to circulation to filtration equipment for removal of the solids, so that the cleaned coolant can be reused.

Drag conveyers are often used to move the heavier solids such as cutting chips down the trough or trench. Jet spray nozzles are also sometimes used to assist the movement of heavy solids induced by the coolant gravity flow.

The coolant shed from the surfaces of the part, cutting tools, and adjacent structure drains downwardly to be collected by the trough located below. Funneling "shed sheets" are often installed to direct the draining coolant into the trough.

Splashing of the coolant out of the trough can sometimes allow the coolant to spill onto the adjacent floor surfaces where it presents a hazard and imposes a maintenance burden. Failures in the coolant supply plumbing such as broken nozzles or pipes can also allow the escape of large volumes of the coolant onto the adjacent floor areas.

As described in U.S. Ser. No. 08/994,447, above grade sloping troughs have advantages over below grade trenches used to collect and transfer the coolant. The spillage of coolant from above grade troughs is a bigger problem than with below grade trenches, since the coolant can be induced to simply drain into a below grade trench but must be cleaned up when an above grade trough is used.

The sloping trough configuration also makes fabrication more complicated as the slope must be matched to the machine tool undersurfaces (or the bottom of the shed sheets) in order to minimize gaps which could allow the escape of over splash of the coolant. Field conditions often do not match the nominal location of the machine tool undersurfaces, such that excessive gaps between the top edges at the sides of the troughs and the machine undersurfaces will often be present.

Accordingly, it is an object of the present invention to provide a more effective splash sealing arrangement for collection troughs and trenches which is adaptable to varying field conditions and makes fabrication and installation of sloping troughs simpler and easier.

SUMMARY OF INVENTION

This object and others which will become apparent upon a reading of the following specification and claims are accomplished by mounting an inflatable hose seal at the top of each side of the collection trough, and pressurizing the seals to cause an upper sealing surface to be moved up as the seal inflates to engage horizontal surfaces on the machine tool. When inflated, the hose seals completely occupy and seal off the intervening space between the trough and the aligned undersurfaces of the machines even if a sloping or uneven surface is encountered. That is, if the height of the intervening space varies down the length of the trough, the hose seals inflate sufficiently to close off and seal the gap at each point along its length.

The hose seal configuration allows a retraction of the upper portion thereof when deflated such as to establish ample clearance for positioning the troughs beneath the machine tool structure undersurfaces, and also provide a considerable range of expansion of the hose seal to accommodate varying gap depths.

DESCRIPTION OF THE DRAWING FIGURES

DETAILED DESCRIPTION

Figure 1:
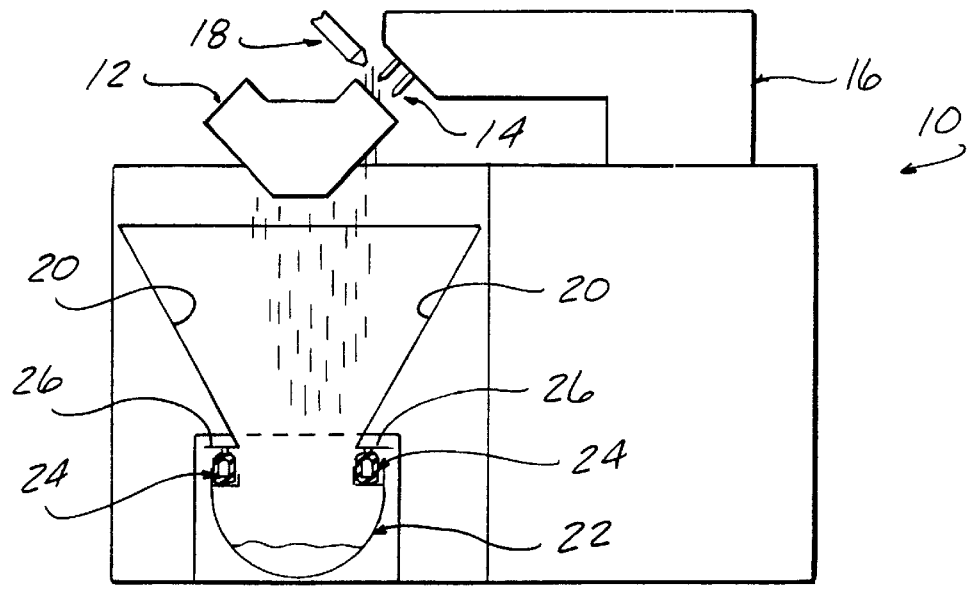
FIG. 1 is a diagrammatic illustration of a machine tool installation and coolant collection trough incorporating a sealing arrangement according to the present invention.

FIG. 1 shows a typical machine tool installation 10, in which a part 12 is conveyed into a station whereat cutting tools 14 mounted to a tool head 16 are to perform machining operations on the part 12. Coolant nozzles 18 direct steams of coolant cutting fluids at the cutting tools and part surfaces.

After drenching the tools and the part, the coolant drains down between shed plates 20 arranged to collect the coolant and funnel the same into an open topped coolant collection trough 22, where the liquid and entrained solids flow to a sump or tank associated with filtration equipment for removal of the solids, to allow reuse of the cleaned coolant in the well known manner.

According to the concept of the present invention, a sealing arrangement is provided which includes a pair of elongated inflatable hose seals 24, which each extend along the top of a respective side of the collection trough 22 and beneath undersurfaces of horizontal plates 26 welded or formed on the bottom of the shed sheets 20.

Figure 2:
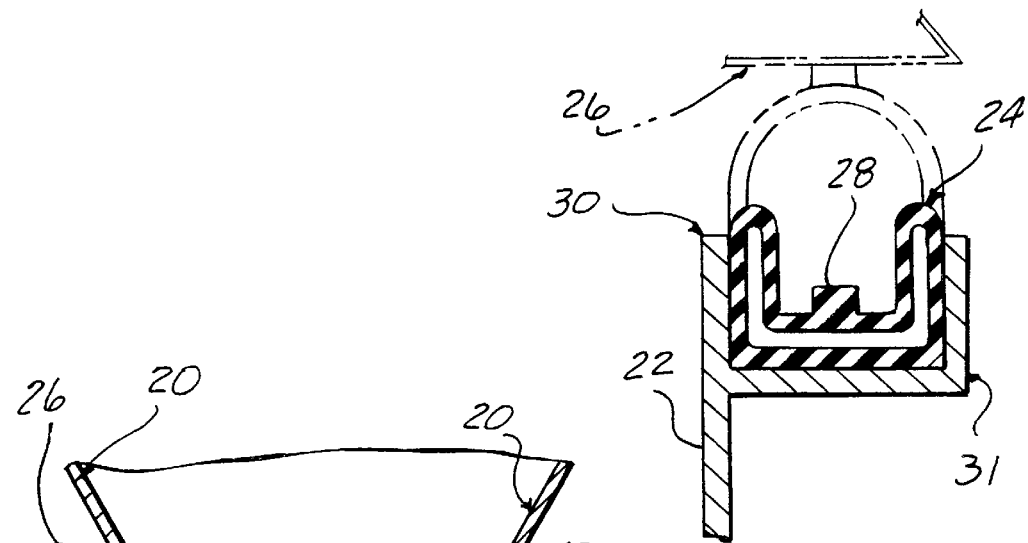
FIG. 2 is an enlarged sectional view of the inflatable hose seal used in the sealing arrangement shown in FIG. 1.

The inflatable hose seals 24 (FIG. 2) are of a type in which the top half portion may be retracted into the bottom half by folding or rolling of the inside of upper sidewall portions into the inside of lower sidewall portions as shown in solid lines. A sealing rib 28 on the top may be molded into the elastomeric material of the hose seals 24 to provide a sealing feature.

The rolling relationships of the inside of the seal walls allows considerable range of depth of the gap between the top 30 side edge of the trough 22 and the undersurface of the plates 26, accommodating a substantial variation due to the slope of the trough 22 and also the nonprecision nature of these structures. A seal channel 31 can be provided along each top edge to secure the seals 24 laterally in position on top of the trough sides.

Figure 3:
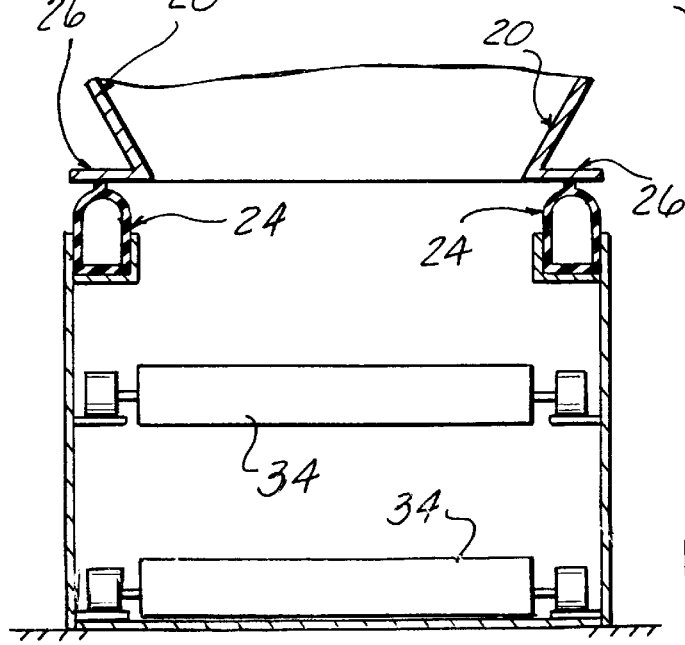
FIG. 3 is a transverse section through a chute having a mechanical conveyor which is also equipped with the sealing arrangement according to the present invention.

FIG. 3 shows lengths of inflatable hose seals 24 used with a channel 32 in which is disposed a drag conveyer 34 for moving accumulated solids.

Figure 4:
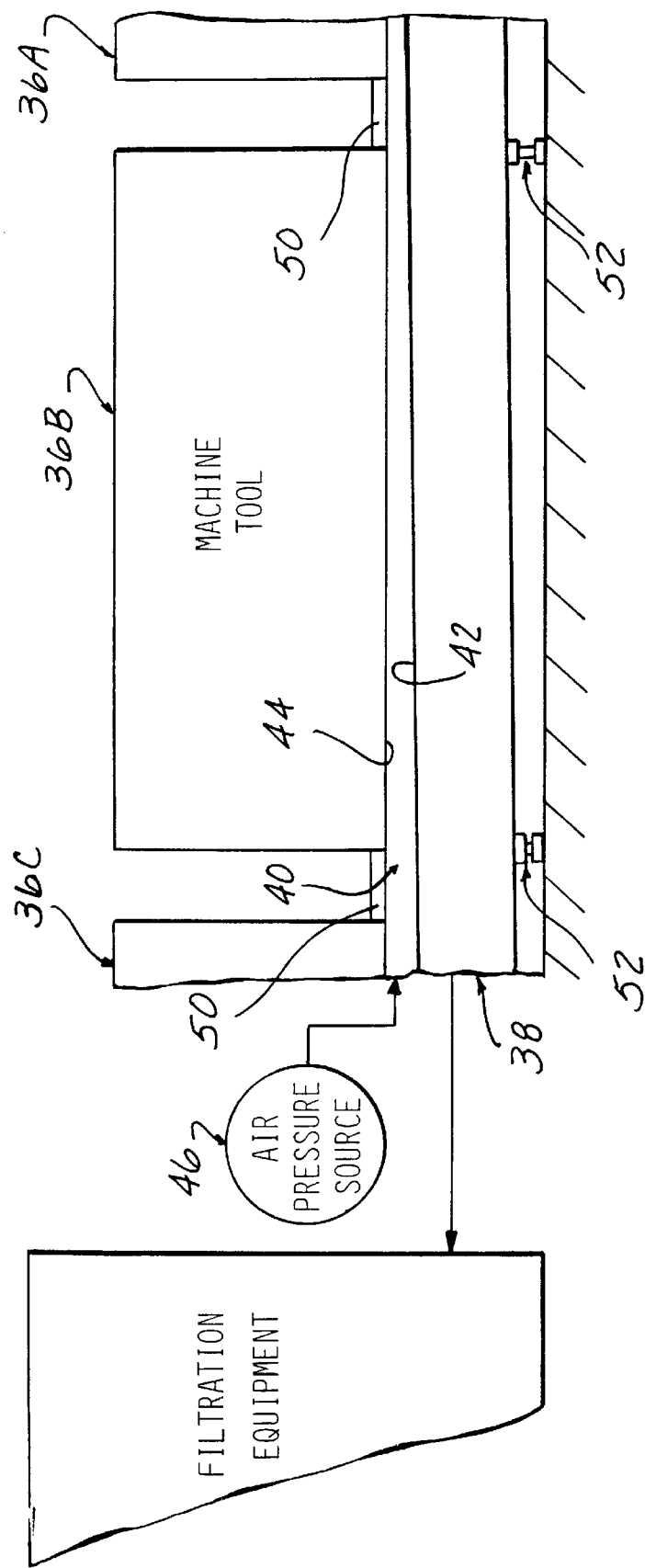
FIG. 4 is a diagrammatic fragmentary side view of a series of machine tools having an inclined collection trough extending along the length thereof, provided with a sealing arrangement according to the invention.

FIG. 4 shows in block diagram form a series of machine tools 36A, 36B, 36C arranged in a series such as in a transfer line.

A downwardly sloping coolant collection trough 38 extends beneath and along the series of machine tools 36A–36C so as to collect coolant draining from the various surfaces drenched by the cooling streams.

A pair of inflatable hose seals 40 are positioned between the top side edges 42 of the collection trough 38 and undersurfaces 44 of the machine tools 36 and are inflated by connection to an air pressure source 46 so as to be tightly fit into the gap therebetween to close off and seal off that opening and prevent any escape of coolant onto the adjacent floor areas. The slope of the trough 38 creates a varying depth gap, which is accommodated by variable extension of the top of the hose seals 40 when inflated.

Auxiliary plates 50 can be provided bridging any gaps between the machine tool undersurfaces 44 to provide more or less continuous sealing surfaces.

The collection trough 38 can itself be of constant depth, and the slope established by adjustable height threaded supports 52 provided at spaced intervals.

Fixed skids of varying heights can also be employed enabling fork lift handling of the trough, which can be formed in sections, when each section is put in place beneath the machine tool bases.

Details of the joint connections between adjacent trough sections are set forth in copending application Ser. No. 08/995,414 referenced above.

What is claimed is:

1. In a machine tool installation including a series of machine tools, each having coolant spray nozzles directing streams of coolant at cutting tools and adjacent surfaces, and an open topped collection trough extending along said series of machine tools positioned to receive downwardly draining coolant from each machine tool, the improvement comprising: elongated inflated seals interposed between respective tops of each of two sides of said collection trough and opposing undersurfaces of structure on each of said machine tools to close off gaps therebetween and prevent coolant from splashing out onto floor areas adjacent said machine tool installation; further including bridging structure bridging spaces between said machine tools in said series providing continuity between said machine tool undersurfaces, said inflated seals also engaging said bridging structure.

2. The machine tool installation according to claim 1 wherein said trough has a sloping contour along said inflated seal means, which is inflated to a varying extent along the length thereof to close off said gaps and seal to said trough side tops, bridging structure and machine tool structure undersurfaces.

3. The machine tool installation of claim 4 wherein adjustable height supports are provided along said trough to establish said slope.

4. The machine tool installation of claim 1 wherein said collection trough is disposed above grade.

5. The machine tool installation of claim 4 wherein said inflatable seal means comprises a pair of inflated hose seal lengths each extending along the length of said series of machine tools, one on each side of said trough, each seal length configured to retract a top portion into a bottom portion of said seal to develop a clearance between said trough and said machine tool structure undersurfaces.

6. The machine tool installation of claim 5 wherein channel pieces on the top edge of the sides of said trough each contain a respective one of said inflated hose seals.

7. The machine tool installation of claim 5 wherein each of said inflated seal lengths is connected to a source of air pressure to be inflated thereby.

8. The machine tool installation of claim 1 wherein said undersurfaces of machine tool structure are defined by bottoms of shed plates draining coolant into said trough.

* * * * *